United States Patent
Farkas et al.

(10) Patent No.: US 9,392,493 B1
(45) Date of Patent: Jul. 12, 2016

(54) METHODS, SYSTEMS, AND COMPUTER PROGRAM PRODUCTS FOR PROVIDING A RAPIDLY SELF-ORGANIZING CELLULAR COMMUNICATIONS NETWORK

(71) Applicant: Collision Communications, Inc., Peterborough, NH (US)

(72) Inventors: Joseph Farkas, Merrimack, NH (US); Brandon Hombs, Merrimack, NH (US)

(73) Assignee: Collision Communications, Inc., Peterborough, NH (US)

( * ) Notice: Subject to any disclaimer, the term of this patent is extended or adjusted under 35 U.S.C. 154(b) by 0 days.

(21) Appl. No.: 14/578,837

(22) Filed: Dec. 22, 2014

(51) Int. Cl.
  *H04W 36/00* (2009.01)
  *H04W 36/02* (2009.01)
  *H04W 84/18* (2009.01)

(52) U.S. Cl.
  CPC .......... *H04W 36/0005* (2013.01); *H04W 36/02* (2013.01); *H04W 84/18* (2013.01)

(58) Field of Classification Search
  CPC .. H04W 36/0005; H04W 36/02; H04W 84/18
  See application file for complete search history.

(56) References Cited

U.S. PATENT DOCUMENTS

| | | | | |
|---|---|---|---|---|
| 8,233,427 B2 * | 7/2012 | Reial | ...................... | H04L 1/0023 370/318 |
| 2004/0095880 A1 * | 5/2004 | Laroia | ................... | H04W 52/34 370/208 |
| 2004/0192360 A1 * | 9/2004 | Tsai | ....................... | H04B 15/02 455/501 |
| 2008/0130582 A1 * | 6/2008 | Lee | ........................ | H04W 36/30 370/332 |
| 2009/0061886 A1 | 3/2009 | Cozzo | | |
| 2010/0069063 A1 * | 3/2010 | Osterling | .............. | H04W 36/20 455/434 |
| 2011/0199986 A1 | 8/2011 | Fong | | |
| 2012/0202542 A1 | 8/2012 | Dimou | | |
| 2012/0276946 A1 * | 11/2012 | Sung | ..................... | H04W 24/00 455/525 |
| 2014/0220972 A1 | 8/2014 | Appel | | |
| 2014/0254564 A1 * | 9/2014 | Khude | ................. | H04B 7/2656 370/336 |
| 2015/0043355 A1 | 2/2015 | Kim | | |
| 2015/0092684 A1 | 4/2015 | Cheng | | |
| 2015/0141027 A1 | 5/2015 | Tsui | | |
| 2015/0208425 A1 | 7/2015 | Caretti | | |
| 2015/0257013 A1 | 9/2015 | Patel | | |
| 2015/0327289 A1 | 11/2015 | Hessler | | |
| 2015/0351051 A1 | 12/2015 | Jeong | | |
| 2015/0358887 A1 | 12/2015 | Xu | | |

* cited by examiner

*Primary Examiner* — Nathan Mitchell

(57) ABSTRACT

Methods and systems are described for providing a rapidly self-organizing cellular communications network. In one aspect, scheduling information is received for at least one mobile device previously scheduled for communication in a first cell of a cellular communications network, the scheduling information corresponding to a scheduling decision made for the first cell without the knowledge of scheduling decisions made for a second cell adjacent to the first cell. Whether to initiate a handover procedure to handover the mobile device to the first cell is determined based on the received scheduling information. The mobile device for is scheduled for communications in the second cell and/or the handover procedure is initiated based on the determination.

52 Claims, 6 Drawing Sheets

METHODS, SYSTEMS, AND COMPUTER PROGRAM PRODUCTS FOR PROVIDING A RAPIDLY SELF-ORGANIZING CELLULAR COMMUNICATIONS NETWORK

RELATED APPLICATIONS

This application is related to U.S. patent application Ser. No. 14/578,829, titled "METHODS, SYSTEMS, AND COMPUTER PROGRAM PRODUCTS FOR PROVIDING A RAPIDLY SELF-ORGANIZING CELLULAR COMMUNICATIONS NETWORK", filed on even date herewith, the entire disclosure of which is here incorporated by reference.

BACKGROUND

Traditionally, optimizing the deployment of cellular networks has required a significant amount of human effort. For example, deploying a base station or a network of base stations typically requires detailed planning beforehand and afterwards in order to optimize the performance of the base stations. Initial planning often includes tasks to analyze the proposed network to determine settings such as power levels, antenna tilts, sectorization patterns, and the like. Additional labor-intensive tasks are undertaken, such as drive tests, to further optimize the network after deployment. Drive tests are typically people driving around the area surrounding the deployed base stations in order to test their performance at various locations. This then leads to further base station optimizations to address problem areas or performance issues.

The labor-intensive nature of these optimization tasks is time consuming and expensive. Automation (or elimination) of some or all of these tasks would therefore provide a savings in time and cost. Note that automation of these tasks does not necessarily require that the same tasks be performed, only that the optimization goals are achieved via a greater level of automation that is traditionally employed. For example, some level of automation can replace the need for drive tests by determining the needed information through other means.

Some level of optimization can be provided by conventional networks, but such optimization has proven inadequate and relatively slow. The types of network automation provided can include self-healing, self-optimization, and self-configuration. Self-healing provides for automated detection and recovery from faults in a network, often from hardware or software issues. Self-optimization provides for automated optimization of a network based on various performance metrics. Self-configuration provides for automating configuration settings such that human intervention is reduced. The more general term of Self-organizing Networks (i.e., SoN) is used herein to refer to these automated tasks.

With base stations being deployed at an increasing density and with the increasing relevance of small cells, the automation of many aspects of base station deployment continues to increase in importance. This occurs not only because there are physically more base stations that are being deployed but because denser base station deployments create increased complexities when deploying new base stations.

It is already appreciated by the cellular industry that SoN is and will continue to become an increasingly important aspect of deploying networks. The majority of the effort for cellular SoNs, however has focused on initial deployment tasks through base station parameter configuration. There have been some additional efforts directed to slowly varying parameters to optimize performance. The slow variations may occur due to traffic patterns, fault conditions, or time of day, among other things. Here, the term "slowly varying" refers to time frames measured in hours or days. Such long time frames are conventionally needed because a base station conventionally does not have access to real time or near real time knowledge of the conditions of its neighboring base stations.

Accordingly, there exists a need for methods, systems, and computer program products for providing a rapidly self-organizing cellular communications network.

SUMMARY

Methods and systems are described for providing a rapidly self-organizing cellular communications network. In one aspect, scheduling information is received for at least one mobile device previously scheduled for communication in a first cell of a cellular communications network, the scheduling information corresponding to a scheduling decision made for the first cell without the knowledge of scheduling decisions made for a second cell adjacent to the first cell. Whether to initiate a handover procedure to handover the mobile device to the first cell is determined based on the received scheduling information. The mobile device for is scheduled for communications in the second cell and/or the handover procedure is initiated based on the determination.

In another aspect, scheduling information is received for at least one mobile device previously scheduled for communication in a first cell of a cellular communications network, the scheduling information corresponding to a scheduling decision made for the first cell without the knowledge of scheduling decisions made for a second cell adjacent to the first cell. Whether to instruct the first cell to initiate a handover procedure to handover one or more mobile devices for communications in the second cell is determined based on the received scheduling information. The first cell is instructed, based on the determination, to initiate the handover procedure to handover the one or more mobile devices for communications in the second cell.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
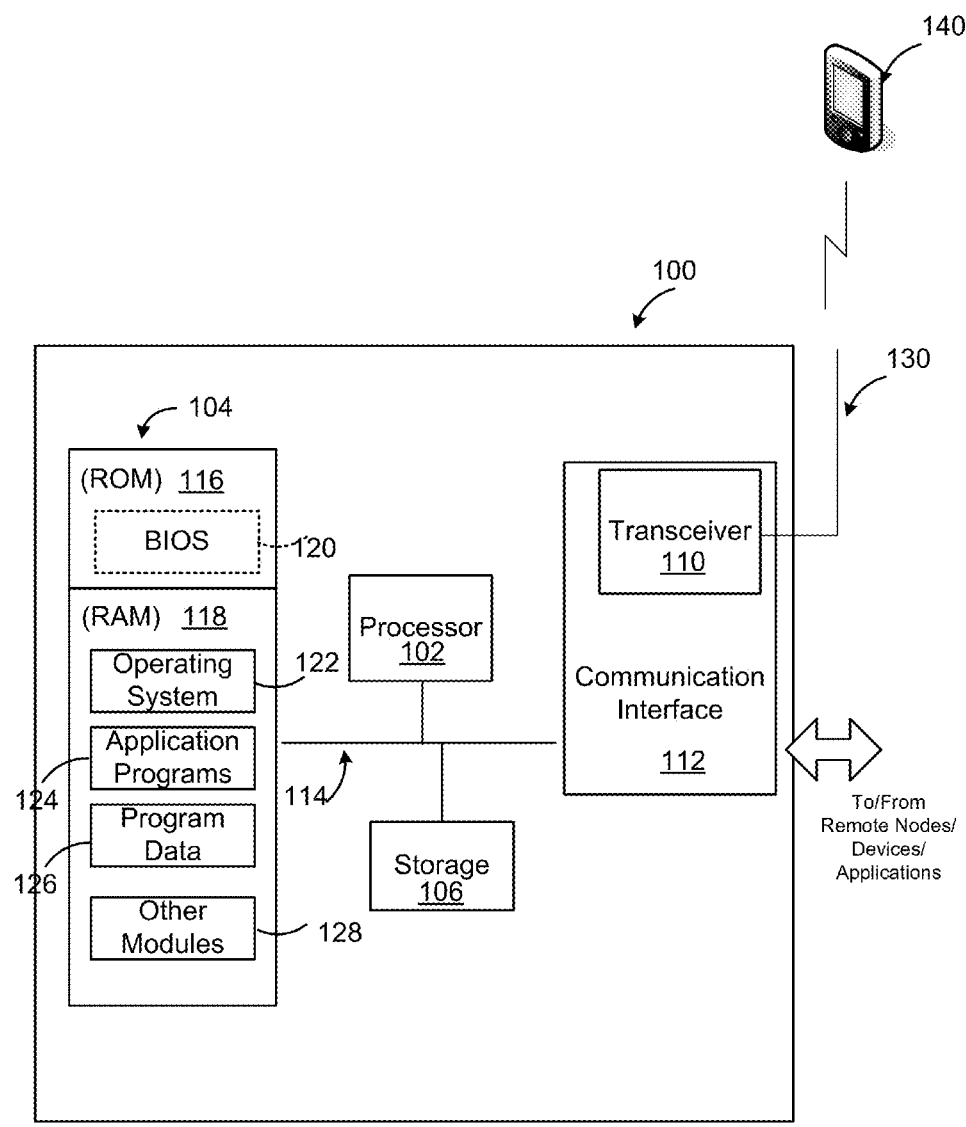
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. The hardware device 100 may be a separate unit that communicates either through wiring or wirelessly with the base station. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash- OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3$^{rd}$ Generation Partnership Project" (3GPP). CDMA2000® and UMB are described in documents from an organization called the "3$^{rd}$ Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit 102 of data in a structured form. This manipulation transforms the data or maintains it at locations in the memory system (including 106, 116, and/or 118) of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4A:
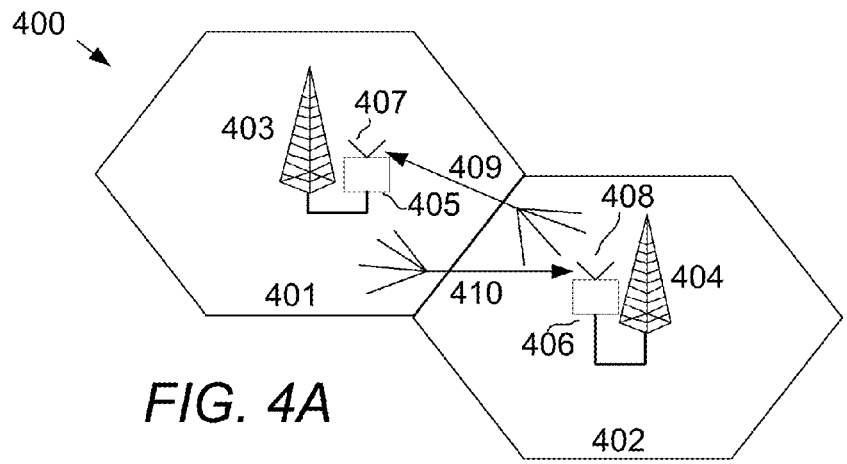
FIGS. 4A-4C are block diagrams illustrating various exemplary arrangements for providing a rapidly self-organizing cellular communications network according to another aspect of the subject matter described herein.
Figure 4B:
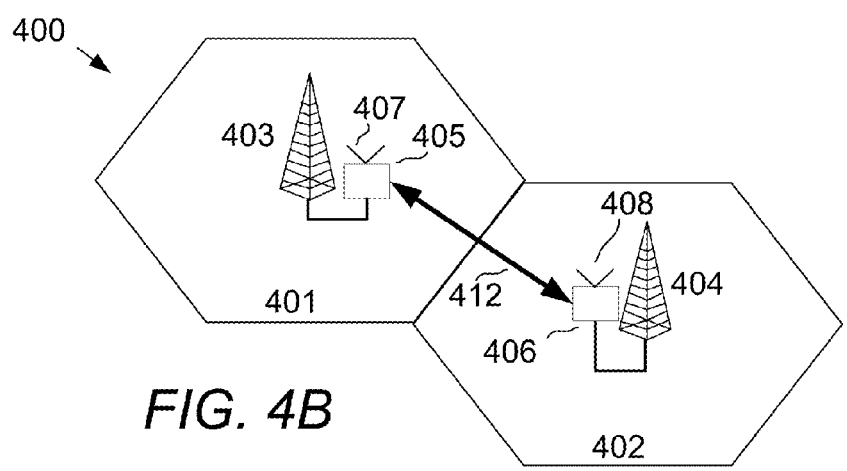
Figure 4C:
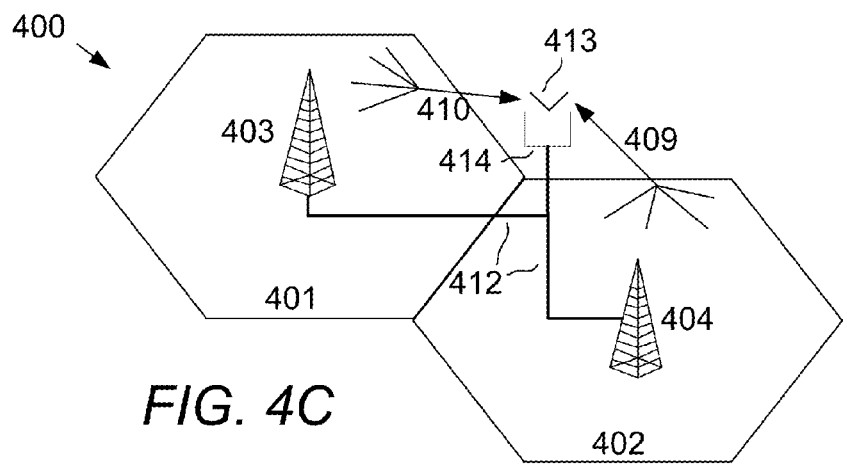

In order to optimize the performance of a cellular communications network in a fast and efficient manner, scheduling information for scheduling communications with mobile devices in adjacent or nearby cells is preferably received in real-time or near real-time. This can be accomplished by associating a monitoring device with one or more base stations to monitor scheduling information that is received from adjacent or nearby cells. For example, FIGS. 4A-4C illustrate two adjacent cells 401, 402 included in a cellular communications network 400. Each cell respectively includes corresponding base stations 403, 404.

According to one aspect illustrated in FIG. 4A, cell 401 includes a monitoring device 405 with one or more antennas 407 for monitoring signals 409 received wirelessly from adjacent cells, such as cell 402. For example, monitoring device 405 can monitor uplink and/or downlink signals within cell 402 exchanged between mobile devices and a respective base station 404. Similarly, cell 402 can include a monitoring device 406 with one or more antennas 408 for monitoring signals 410 received wirelessly from adjacent cells, such as cell 401. For example, monitoring device 406 can monitor uplink and/or downlink signals within cell 401 exchanged between mobile devices and respective base station 403. In one aspect, the monitoring device 406 can directly monitor control channels from transmissions in cell 401 in order to receive the scheduling information. Alternatively, or in addition, the monitoring device 406 can monitor data transmissions in cell 401 in order to detect what the scheduling information is. This later approach is referred to as "blind detection." Although a reciprocal relationship between cells 401 and 402 is illustrated in FIG. 4A, this reciprocity is entirely optional. Accordingly, it should be understood that the subject matter described herein also contemplates only one of the cells 401, 402, such as cell 401, including a monitoring device 405.

According to another aspect illustrated in FIG. 4B, an arrangement in which monitoring devices 405, 406 in adjacent cells share information 412 about their respective cells 401, 402 either through a wired connection, wirelessly via antennas 407, 408, or both wired and wirelessly. The information shared by monitoring devices 405, 406 can be obtained from their respective base stations 403, 404 or from another source having, for example, scheduling information for each respective cell. The monitoring devices 405, 406 can not only receive scheduling information, but can receive other information, such as buffer sizes and reports on packet success. Again, reciprocity is not required such that it should be understood that the subject matter described herein contemplates only one of the cells 401, 402, such as cell 401, including a monitoring device 405.

According to another aspect illustrated in FIG. 4C, a monitoring device 414 may be remotely located away from cells 401, 402 (although not required to be remote), but monitor one or more of the cells 401, 402, either through a wired connection to one or more of their respective base stations 403, 404, a wireless connection to one or more of their respective base stations 403, 404, and/or through the monitoring of signals 409 and/or 410 received wirelessly from uplink and/or downlink signals within the cells 401, 402 exchanged between mobile devices and respective base stations 403, 404.

By receiving and analyzing this information, monitoring devices 405 and/or 406 can each essentially profile respective adjacent (or nearby) base stations 403, 404 in order to understand their performance. The monitoring device can instruct the respective base station for its cell to make adjustments based on the analysis and can observe the effect of these adjustments on the adjacent cell's performance. For example, monitoring device 405 can instruct base station 403 to make adjustments based on an analysis of information received for adjacent cell 402 and can observe the effect of these adjustments on the cell 402's performance. This is effectively a closed loop feedback which can be optimized based on various performance metrics, as described further below. Preferably, analysis of an adjacent cell's performance is done at times when the base station associated with the monitoring device is not transmitting in order to avoid, for example, interference from the stronger signals of the base station.

In an example, during the period when base station 403 is not transmitting, monitoring device 405 can receive information from cell 402 and based on this information can get a better estimate as to the performance of, for example base station 404. Based on the monitoring of base station 404, metrics and statistics can be determined such as throughput, packet error rate, modulation, and coding selection. Monitoring device 405 can, based on the received information, instruct base station 403 to begin to adjust certain parameters and observe the impact this will have on the performance metrics of base station 404. After multiple rounds of tweaking these parameters, base station 403 may find parameters that both optimize metrics at base station 403 and base station 404. The parameters adjusted may be power level, modulation and coding, precoding matrices, power control parameters, and the like. Reciprocally, monitoring device 406 may be analyzing signals from cell 401 and instructing base station 404 to adjust parameters. These adjustments can be made repeatedly in order to optimize the system as changes occur, such as when new users are added, there are new throughput demands, and the like. These adjustments, based on near real time information from the adjacent cell, can be performed rapidly and repeatedly in order to optimize the system quickly as changes occur, such as when new users are added, there are new throughput demands, and the like.

Figure 2:
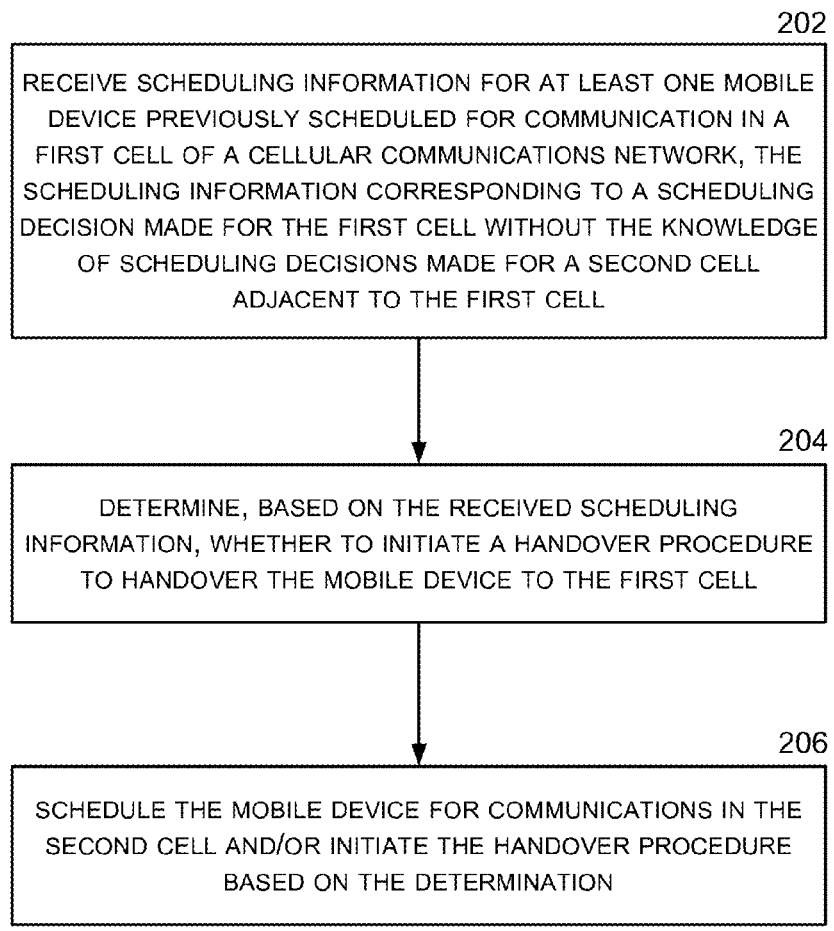
FIG. 2 is a flow diagram illustrating a method for providing a rapidly self-organizing cellular communications network according to an aspect of the subject matter described herein.
Figure 3:
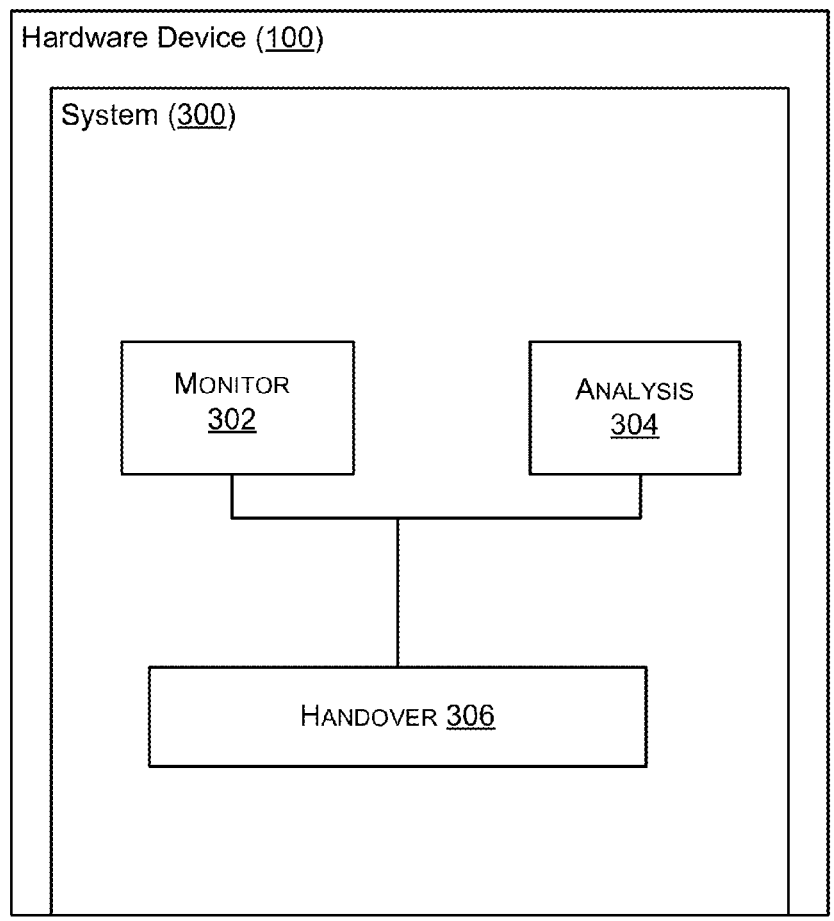
FIG. 3 is a block diagram illustrating an arrangement of components for providing a rapidly self-organizing cellular communications network according to another aspect of the subject matter described herein.

Turning now to FIG. 2, a flow diagram is illustrated illustrating a method for providing a rapidly self-organizing cellular communications network according to an exemplary aspect of the subject matter described herein. FIG. 3 is a block diagram illustrating an arrangement of components for providing a rapidly self-organizing cellular communications network according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202 scheduling information is received for at least one mobile device previously scheduled for communication in a first cell of a cellular communications network, the scheduling information corresponding to a scheduling decision made for the first cell without the knowledge of scheduling decisions made for a second cell adjacent to the first cell. Accordingly, a system for providing a rapidly self-organizing cellular communications network includes means for receiving scheduling information for at least one mobile device previously scheduled for communication in a first cell of a cellular communications network. For example, as illustrated in FIG. 3, a monitor component 302 is configured to receive scheduling information for at least one mobile device previously scheduled for communication in a first cell of a cellular communications network.

Figure 5:
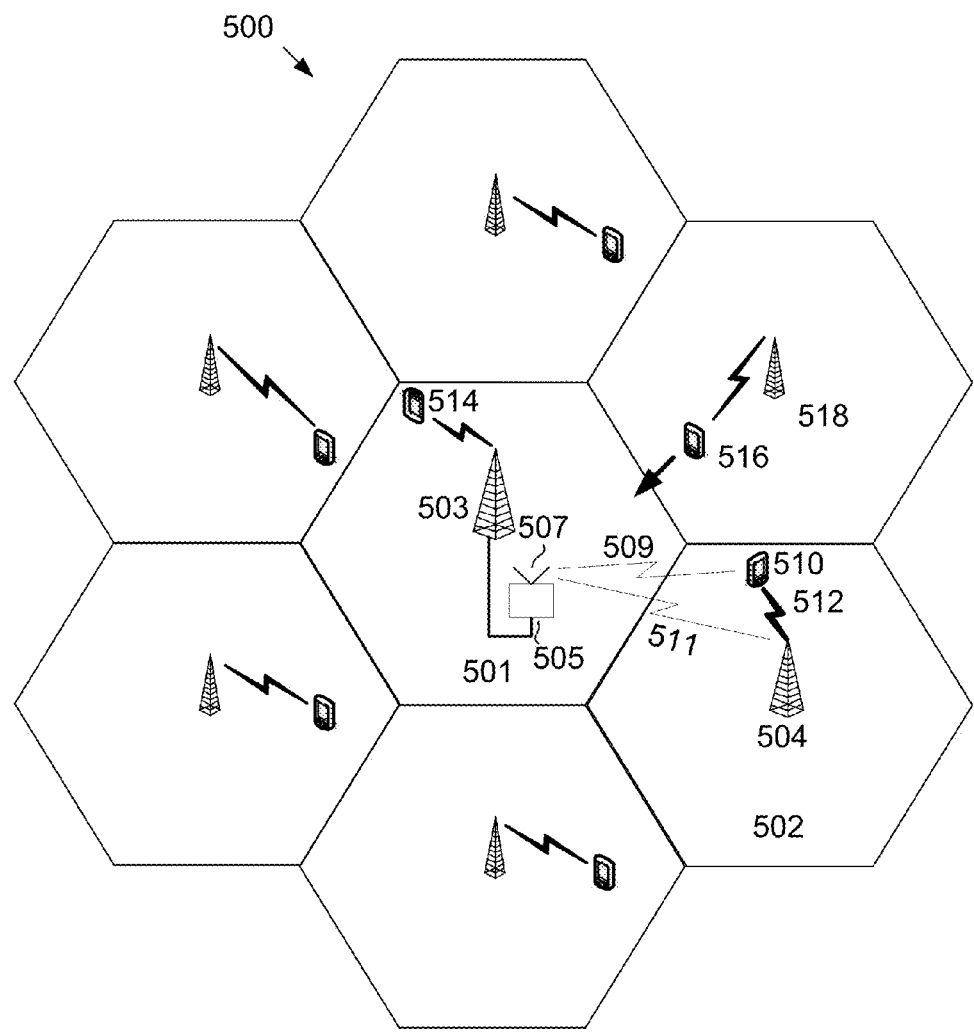
FIG. 5 is a block diagram illustrating an exemplary arrangement for providing a rapidly self-organizing cellular communications network according to another aspect of the subject matter described herein.

With reference to FIG. 5, cellular communications system 500 includes, among its many cells, adjacent cells 501 and 502 having corresponding base stations 503 and 504. Cell 501 also includes a monitoring device 505 having an antenna 507. Monitoring device 505 can include the components illustrated in the exemplary arrangement in FIG. 3 operating in a compatible execution environment, such as the environment provided by some or all of the components of the arrangement in FIG. 1. Each cell in the system includes a respective base station that communicates with one or more mobile devices. For example, base station 504 of cell 502 can communicate with mobile device 510 as well as other mobile devices (not shown). Communications between mobile device 510 and base station 504 can be in the downlink direction (i.e., from base station 504 to mobile device 510) and in the uplink direction (i.e., from a mobile device 510 to base station 504), which are both represented by signals 512 in FIG. 5. Monitoring device 505 can receive wireless downlink signals 511 intended for mobile device 510 (as well as other mobile devices) and/or wireless uplink signals intended for base station 504. Through receipt of these signals, the monitor component 302 of monitoring device 505 receives scheduling information. For example, monitoring device 505 can monitor control channels that include the scheduling information. More particularly, downlink control channels can contain information for the scheduling decisions for downlink data transmissions and uplink scheduling grants. The scheduling information corresponds to a scheduling decision made for the cell 502 without the knowledge of scheduling decisions made for adjacent cell 501. As discussed above and illustrated in FIGS. 4A-4C, scheduling information can also be received a number of other ways in a number of other arrangements.

In the example illustrated by FIG. 5, mobile device 510 was previously scheduled for communications with base station 504. The scheduling information corresponds to a scheduling decision made for cell 502 without the knowledge of scheduling decisions made for cell 501. Cellular systems typically operate where each base station is independently making decisions about how to schedule mobile devices. The SoN operation utilizes the monitoring device to understand the scheduling information, which gives real-time or near real-time insight into what is happening at an adjacent base station 504. Since base station 503 is simultaneously sending out its scheduling information, there is not enough time for base station 504 to take into account the scheduling decisions of base station 503 prior to scheduling mobile device 510. Accordingly, joint decisions on scheduling devices at both base stations are not possible prior to scheduling at both base stations.

Accordingly, in an aspect, the monitor component 302 can be configured to receive scheduling information for at least one mobile device scheduled for communication in a first cell of a cellular communications network by decoding uplink and/or downlink transmissions of the an adjacent cell to determine the scheduling information. For example, as illustrated in FIG. 5, monitoring device 505 can receive and decode uplink signals 509 and/or downlink signals 511 transmitted in cell 502.

In an aspect, the monitor component 302 can be configured to receive the scheduling information via a wired connection, as discussed above with reference to FIGS. 4B and 4C. In another aspect, the monitor component 302 can be configured to receive scheduling information by wirelessly monitoring a control channel and/or a data channel of the first cell, as discussed above with reference to FIGS. 4A-C.

Returning to FIG. 2, in block 204 whether to initiate a handover procedure to handover the mobile device to the first cell is determined based on the received scheduling information. Accordingly, a system for providing a rapidly self-organizing cellular communications network includes means for determining, based on the received scheduling information, whether to initiate a handover procedure to handover the mobile device to the first cell. For example, as illustrated in FIG. 3, an analysis component 302 is configured to determine, based on the received scheduling information, whether to initiate a handover procedure to handover the mobile device to the first cell.

In one aspect, the analysis component 304 can be configured to determine, based on the received scheduling information, whether to initiate a handover procedure from transmissions of the first cell monitored based on the received scheduling information. For example, the analysis component 304 can be configured to determine modulation, coding selection, transmission time, transmission bandwidth, and transmission bandwidth location. The analysis component 304 can be configured to determine from the monitored transmissions of the first cell at least one of throughput, packet error rate, block error rate, cell utilization, and buffer sizes and can, based on this information determine whether to initiate a handover procedure. Similarly, the analysis component 304 can be configured to determine from the monitored transmissions of the first cell at least one of instantaneous throughput and packet success and can, based on this information determine whether to initiate a handover procedure. For example, analysis component 304 can determine whether any of the uplink or downlink communications 512 have failed by monitoring responses, retries, and the like.

In another aspect, the analysis component 304 can be configured to determine from the monitored transmissions of the first cell whether to initiate a handover procedure based on at least one of transmit power level, receiver power level, scheduled time, frequency, bandwidth, modulation, coding, precoding matrices, and power control parameters. For example, with reference to FIG. 5, there is a lot of interference being received at mobile device 510 in adjacent cell 502. Traditionally, there is little that is done except that the modulation and coding is lowered until mobile device 510 can receive packets correctly. The lower modulation and coding results in less data for a user of mobile device 510. According to the subject matter described herein, analysis of the scheduling information received by monitoring device 505 determines that mobile device 510 is experiencing a lot of interference. As described further below, handover decisions can be made to rectify the situation.

In similar respects, the analysis component 304 can be configured to determine whether to initiate a handover procedure to handover the mobile device for communications in the first cell by considering at least one of improving sum capacity of at least one of the first or second cell, reducing interference to at least one of the first or second cell, balancing cell load, and providing a minimum quality of minimum quality of service to users of mobile devices in at least one of the first or second cell.

Returning to FIG. 2, in block 206 the mobile device is scheduled for communications in the second cell and/or the handover procedure is initiated based on the determination. Accordingly, a system for providing a rapidly self-organizing cellular communications network includes means for at least one of scheduling the mobile device for communications in the second cell and initiating the handover procedure based on the determination. For example, as illustrated in FIG. 3, a handover component 306 is configured to at least one of schedule the mobile device for communications in the second cell and initiating the handover procedure based on the determination.

By way of example, with reference again to FIG. 5, mobile device 514 is associated with base station 503, which is a highly utilized cell. Mobile device 514 may see base station 504 with a lower power and thus avoid connecting to it even in cases where base station 504 is underutilized. Monitoring device 505, through monitoring of any of the above-described aspects of cell 502, can determine that base station 504 is underutilized and report this to base station 503. Base station 503, in response, can initiate a handover of mobile device 514 to the less utilized base station 504.

In another example, mobile device 516, currently assigned to base station 518, is moving into cell 501 (e.g., in a moving vehicle). Mobile device 516 sees base station 503 with a higher power than it sees base station 504 and may connect to base station 503 even in cases where base station 504 is underutilized and/or base station 503 is over utilized. In such a case, mobile device 516 will be scheduled for communications with base station 503. Monitoring device 505, through monitoring of any of the above-described aspects of cell 502, can determine that base station 504 is underutilized and report this to base station 503. Handover component 306, in response, can instruct base station 503 to initiate a handover of mobile device 516 to the less utilized base station 504. Alternatively, handover component 306, in response, can instruct base station 503 to initiate a handover of mobile device 516 to base station 504 prior to mobile device 516 being scheduled for communications with base station 503.

Handovers can be initiated similarly as described above when a mobile device is associated with a cell and the mobile device is experiencing degraded performance as determined by monitoring device 505 but would have better performance by joining another cell. Monitoring device 505, for example, can identify the degraded performance through a high block error rate or low modulation and coding and can then inform the appropriate network entity, such as a base station, to initiate the handover.

Figure 6:
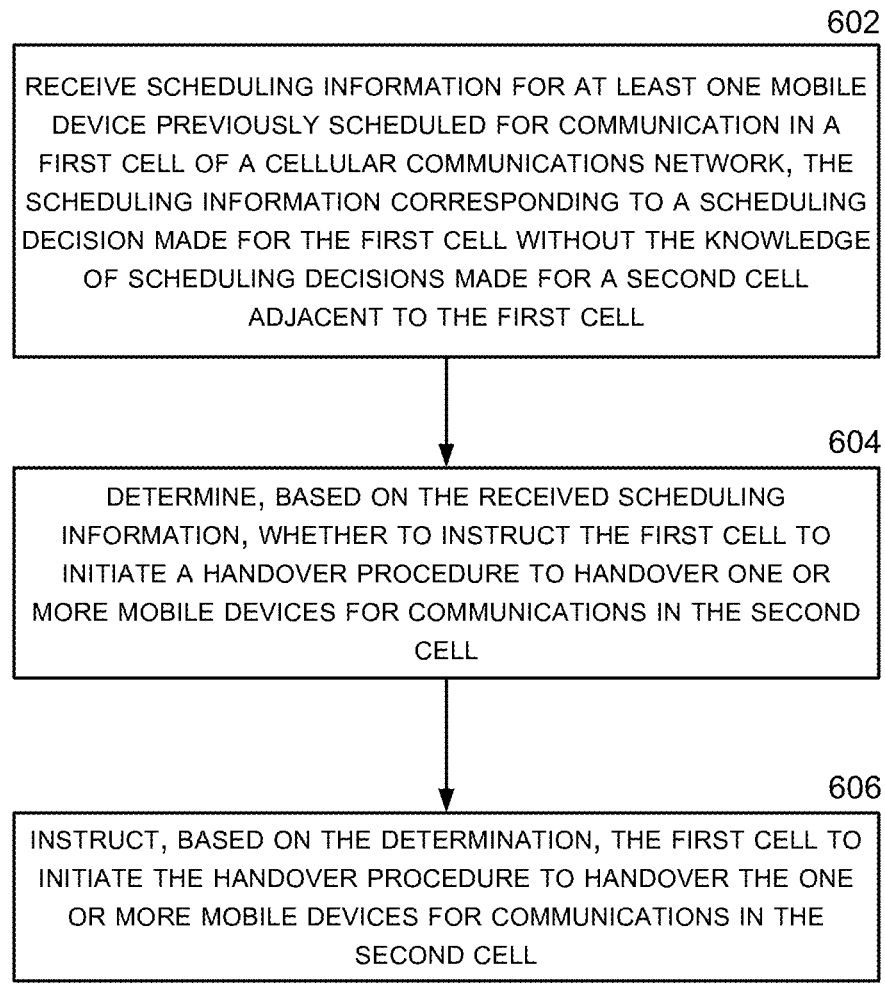
FIG. 6 is a flow diagram illustrating another method for a rapidly self-organizing cellular communications network according to another aspect of the subject matter described herein.

Turning now to FIG. 6, a flow diagram is illustrated illustrating a method for providing a rapidly self-organizing cellular communications network according to an exemplary aspect of the subject matter described herein. The method in FIG. 6 can be carried out by, for example, some or all of the components illustrated in the exemplary arrangement in FIG. 3 operating in a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 6, in block 602 scheduling information is received for at least one mobile device previously scheduled for communication in a first cell of a cellular communications network, the scheduling information corresponding to a scheduling decision made for the first cell without the knowledge of scheduling decisions made for a second cell adjacent to the first cell. Accordingly, a system for a rapidly self-organizing cellular communications network includes means for receiving scheduling information for at least one mobile device previously scheduled for communication in a first cell of a cellular communications network. For example, as illustrated in FIG. 3, the monitor component 302 is configured to receive scheduling information for at least one mobile device previously scheduled for communication in a first cell of a cellular communications network.

As described above and illustrated with reference again to FIGS. 4A-4C, the monitor component 302 can be configured to receive scheduling information for at least one mobile device scheduled for communication in a first cell of a cellular communications network by decoding uplink transmissions and/or by decoding downlink transmissions, by receiving the scheduling information via a wired connection, by wirelessly monitoring a control channel of the first cell, and/or by wirelessly monitoring a data channel of the first cell.

Returning to FIG. 6, in block 604 whether to instruct the first cell to initiate a handover procedure to handover one or more mobile devices for communications in the second cell is determined based on the received scheduling information. Accordingly, a system for a rapidly self-organizing cellular communications network includes means for determining, based on the received scheduling information, whether to instruct the first cell to initiate a handover procedure to handover one or more mobile devices for communications in the second cell. For example, as illustrated in FIG. 3, an analysis component 304 is configured to determine, based on the received scheduling information, whether to instruct the first cell to initiate a handover procedure to handover one or more mobile devices for communications in the second cell.

In one aspect, the analysis component 304 can be configured to determine, based on the received scheduling information, whether to instruct the first cell to initiate a handover procedure to handover one or more mobile devices for communications in the second cell. For example, the analysis component 304 can be configured to determine modulation, coding selection, transmission time, transmission bandwidth, and transmission bandwidth location. The analysis component 304 can be configured to determine from the monitored transmissions of the first cell at least one of throughput, packet error rate, block error rate, cell utilization, and buffer sizes and can, based on this information determine at least one parameter for communications in the second cell that improves performance of the first cell. Similarly, the analysis component 304 can be configured to determine from the monitored transmissions of the first cell at least one of instantaneous throughput and packet success and can, based on this information determine whether to initiate a handover procedure. For example, analysis component 304 can determine whether any of the uplink or downlink communications 512 have failed by monitoring responses, retries, and the like.

In another aspect, the analysis component 304 can be configured to determine from the monitored transmissions of the first cell whether to instruct the first cell to initiate a handover procedure to handover one or more mobile devices for communications in the second cell based on at least one of transmit power level, receiver power level, scheduled time, frequency, bandwidth, modulation, coding, precoding matrices, and power control parameters. For example, with reference to FIG. 5, suppose base station 504 is introducing a lot of interference to mobile device 514 in cell 501. Traditionally, there is little that is done except that the modulation and coding is lowered until mobile device 514 can receive packets correctly. The lower modulation and coding results in less data for a user of mobile device 514. According to the subject matter described herein, analysis of the scheduling information received by monitoring device 505 determines that base station 504 is introducing a lot of interference to mobile device 514. As described further below, handover decisions can be initiated and/or made to rectify the situation.

In similar respects, the analysis component 304 can be configured to determine whether to initiate a handover procedure to handover the mobile device for communications in the first cell by considering at least one of improving sum capacity of at least one of the first or second cell, reducing interference to at least one of the first or second cell, balancing cell load, and providing a minimum quality of minimum quality of service to users of mobile devices in at least one of the first or second cell.

Returning to FIG. 6, in block 606 the first cell is instructed, based on the determination, to initiate the handover procedure to handover the one or more mobile devices for communications in the second cell. Accordingly, a system for a rapidly self-organizing cellular communications network includes means for instructing, based on the determination, the first cell to initiate the handover procedure to handover the one or more mobile devices for communications in the second cell. For example, as illustrated in FIG. 3, a handover component 306 is configured to instruct, based on the determination, the first cell to initiate the handover procedure to handover the one or more mobile devices for communications in the second cell.

By way of example, mobile device 510 is associated with base station 504, which is a highly utilized cell as determined by monitoring device 505. Monitoring device 505 is also aware that base station 503 is underutilized and can recommend to base station 504 that it initiate a handover of mobile device 510 to base station 503. Handover component 306, in response, can instruct base station 503 to initiate the handover of mobile device 510 to the less utilized base station 503.

Handovers can be initiated similarly as described above when a mobile device is associated with a cell and the mobile device is experiencing degraded performance as determined by monitoring device 505 but would have better performance by joining another cell. Monitoring device 505, for example, can identify the degraded performance through a high block error rate or low modulation and coding and can then inform the appropriate network entity, such as a base station, to initiate the handover.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for providing a rapidly self-organizing cellular communications network, the method comprising:
    monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
    determining, based on the received scheduling information, whether to initiate a handover procedure to handover the mobile device to the first cell; and
    at least one of scheduling the mobile device for communications in the second cell and initiating the handover procedure based on the determination;
    wherein at least one of the preceding actions is performed on at least one electronic hardware component.

2. The method of claim 1 wherein receiving scheduling information for at least one mobile device scheduled for communication in a first cell of a cellular communications network includes decoding uplink transmissions.

3. The method of claim 1 wherein receiving scheduling information for at least one mobile device scheduled for communication in a first cell of a cellular communications network includes decoding downlink transmissions.

4. The method of claim 1 wherein receiving scheduling information for at least one mobile device scheduled for communication in a first cell of a cellular communications network includes receiving the scheduling information via a wired connection.

5. The method of claim 1 wherein receiving scheduling information for at least one mobile device scheduled for communication in a first cell of a cellular communications network includes wirelessly monitoring a control channel of the first cell.

6. The method of claim 1 wherein receiving scheduling information for at least one mobile device scheduled for communication in a first cell of a cellular communications network includes wirelessly monitoring a data channel of the first cell.

7. The method of claim 1 wherein determining, based on the received scheduling information, whether to initiate a handover procedure includes determining at least one of modulation, coding selection, transmission time, transmission bandwidth, and transmission bandwidth location.

8. The method of claim 1 wherein determining, based on the received scheduling information, whether to initiate a handover procedure includes determining at least one of instantaneous throughput and packet success.

9. The method of claim 1 wherein determining, based on the received scheduling information, whether to initiate a handover procedure includes determining at least one of throughput, packet error rate, block error rate, cell utilization, and buffer sizes.

10. The method of claim 1 wherein determining whether to initiate a handover procedure to handover the mobile device to the first cell includes determining based on at least one of transmit power level, receiver power level, scheduled time, frequency, bandwidth, modulation, coding, precoding matrices, and power control parameters.

11. The method of claim 1 wherein determining whether to initiate a handover procedure to handover the mobile device for communications in the first cell includes considering at least one of improving sum capacity of at least one of the first or second cell, reducing interference to at least one of the first or second cell, balancing cell load, and providing a minimum quality of minimum quality of service to users of mobile devices in at least one of the first or second cell.

12. The method of claim 1 wherein a signal from the second cell has more power than a signal from the first cell as received at the requesting mobile device.

13. A method for a rapidly self-organizing cellular communications network, the method comprising:
    monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
    determining, based on the received scheduling information, whether to instruct the first cell to initiate a handover procedure to handover one or more mobile devices for communications in the second cell; and
    instructing, based on the determination, the first cell to initiate the handover procedure to handover the one or more mobile devices for communications in the second cell;
    wherein at least one of the preceding actions is performed on at least one electronic hardware component.

14. The method of claim 13 wherein receiving scheduling information for at least one mobile device scheduled for communication in a first cell of a cellular communications network includes decoding uplink transmissions.

15. The method of claim 13 wherein receiving scheduling information for at least one mobile device scheduled for communication in a first cell of a cellular communications network includes decoding downlink transmissions.

16. The method of claim 13 wherein receiving scheduling information for at least one mobile device scheduled for communication in a first cell of a cellular communications network includes receiving the scheduling information via a wired connection.

17. The method of claim 13 wherein receiving scheduling information for at least one mobile device scheduled for communication in a first cell of a cellular communications network includes wirelessly monitoring a control channel of the first cell.

18. The method of claim 13 wherein receiving scheduling information for at least one mobile device scheduled for communication in a first cell of a cellular communications network includes wirelessly monitoring a data channel of the first cell.

19. The method of claim 13 wherein determining, based on the received scheduling information, instruct the first cell to initiate a handover procedure includes determining at least one of modulation, coding selection, transmission time, transmission bandwidth, and transmission bandwidth location.

20. The method of claim 13 wherein determining, based on the received scheduling information, instruct the first cell to initiate a handover procedure includes at least one of instantaneous throughput and packet success.

21. The method of claim 13 determining, based on the received scheduling information, instruct the first cell to initiate a handover procedure includes determining at least one of throughput, packet error rate, block error rate, cell utilization, and buffer sizes.

22. The method of claim 13 wherein determining whether to instruct the first cell to initiate a handover procedure to handover one or more mobile devices for communications in the second cell includes determining based on at least one of power level, scheduled time, frequency, bandwidth, modulation, coding, precoding matrices, and power control parameters.

23. The method of claim 13 wherein determining whether to instruct the first cell to initiate a handover procedure to handover one or more mobile devices for communications in the second cell includes considering at least one of improving sum capacity of at least one of the first or second cell, reducing interference to at least one of the first or second cell, balancing cell load of the first or second cell, and providing a minimum quality of minimum quality of service to users of mobile devices in at least one of the first or second cell.

24. The method of claim 13 wherein a signal from the second cell has more power than a signal from the first cell as received at the requesting mobile device.

25. A system for providing a rapidly self-organizing cellular communications network, the system comprising:
means for monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
means for determining, based on the received scheduling information, whether to initiate a handover procedure to handover the mobile device to the first cell; and
means for at least one of scheduling the mobile device for communications in the second cell and initiating the handover procedure based on the determination;
wherein at least one of the means includes at least one electronic hardware component.

26. A system for providing a rapidly self-organizing cellular communications network, the system comprising system components including:
a monitor component configured for monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
an analysis component configured for determining, based on the received scheduling information, whether to initiate a handover procedure to handover the mobile device to the first cell; and
a handover component configured for at least one of scheduling the mobile device for communications in the second cell and initiating the handover procedure based on the determination;
wherein at least one of the system components includes at least one electronic hardware component.

27. The system of claim 26 wherein the monitor component is configured to receive scheduling information for at least one mobile device scheduled for communication in a first cell of a cellular communications network by decoding uplink transmissions.

28. The system of claim 26 wherein the monitor component is configured to receive scheduling information for at least one mobile device scheduled for communication in a first cell of a cellular communications network by decoding downlink transmissions.

29. The system of claim 26 wherein the monitor component is configured to receive scheduling information for at least one mobile device scheduled for communication in a first cell of a cellular communications network by receiving the scheduling information via a wired connection.

30. The system of claim 26 wherein the monitor component is configured to receive scheduling information for at least one mobile device scheduled for communication in a first cell of a cellular communications network by wirelessly monitoring a control channel of the first cell.

31. The system of claim 26 wherein the monitor component is configured to receive scheduling information for at least one mobile device scheduled for communication in a first cell of a cellular communications network by wirelessly monitoring a data channel of the first cell.

32. The system of claim 26 wherein the analysis component is configured to determine, based on the received scheduling information, whether to initiate a handover procedure by determining at least one of modulation, coding selection, transmission time, transmission bandwidth, and transmission bandwidth location.

33. The system of claim 26 wherein the analysis component is configured to determine, based on the received scheduling information, whether to initiate a handover procedure by determining at least one of instantaneous throughput and packet success.

34. The system of claim 26 wherein the analysis component is configured to determine, based on the received scheduling information, whether to initiate a handover procedure by determining at least one of throughput, packet error rate, block error rate, cell utilization, and buffer sizes.

35. The system of claim 26 wherein the analysis component is configured to determine whether to initiate a handover procedure to handover the mobile device to the first cell by determining based on at least one of transmit power level, receiver power level, scheduled time, frequency, bandwidth, modulation, coding, precoding matrices, and power control parameters.

36. The system of claim 26 wherein the analysis component is configured to determine whether to initiate a handover procedure to handover the mobile device for communications in the first cell by considering at least one of improving sum capacity of at least one of the first or second cell, reducing interference to at least one of the first or second cell, balancing cell load, and providing a minimum quality of minimum quality of service to users of mobile devices in at least one of the first or second cell.

37. The system of claim 26 wherein a signal from the second cell has more power than a signal from the first cell as received at the requesting mobile device.

38. A system for a rapidly self-organizing cellular communications network, the system comprising:
means for monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
means for determining, based on the received scheduling information, whether to instruct the first cell to initiate a handover procedure to handover one or more mobile devices for communications in the second cell
means for instructing, based on the determination, the first cell to initiate the handover procedure to handover the one or more mobile devices for communications in the second cell;
wherein at least one of the means includes at least one electronic hardware component.

39. A system for a rapidly self-organizing cellular communications network, the system comprising system components including:
a monitor component configured for monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
an analysis component configured for determining, based on the received scheduling information, whether to instruct the first cell to initiate a handover procedure to handover one or more mobile devices for communications in the second cell; and
a handover component configured for instructing, based on the determination, the first cell to initiate the handover procedure to handover the one or more mobile devices for communications in the second cell;
wherein at least one of the system components includes at least one electronic hardware component.

40. The system of claim 39 wherein the monitor component is configured to receive scheduling information for at least one mobile device scheduled for communication in a first cell of a cellular communications network by decoding uplink transmissions.

41. The system of claim 39 wherein the monitor component is configured to receive scheduling information for at least one mobile device scheduled for communication in a first cell of a cellular communications network by decoding downlink transmissions.

42. The system of claim 39 wherein the monitor component is configured to receive scheduling information for at least one mobile device scheduled for communication in a first cell of a cellular communications network by receiving the scheduling information via a wired connection.

43. The system of claim 39 wherein the monitor component is configured to receive scheduling information for at least one mobile device scheduled for communication in a first cell of a cellular communications network by wirelessly monitoring a control channel of the first cell.

44. The system of claim 39 wherein the monitor component is configured to receive scheduling information for at least one mobile device scheduled for communication in a first cell of a cellular communications network by wirelessly monitoring a data channel of the first cell.

45. The system of claim 39 wherein the analysis component is configured to determine, based on the received scheduling information, whether to instruct the first cell to initiate a handover procedure by determining at least one of modulation, coding selection, transmission time, transmission bandwidth, and transmission bandwidth location.

46. The system of claim 39 wherein the analysis component is configured to determine, based on the received scheduling information, whether to instruct the first cell to initiate a handover procedure by determining at least one of instantaneous throughput and packet success.

47. The system of claim 39 wherein the analysis component is configured to determine, based on the received scheduling information, whether to instruct the first cell to initiate a handover procedure by determining at least one of throughput, packet error rate, block error rate, cell utilization, and buffer sizes.

48. The system of claim 39 wherein the analysis component is configured to determine whether to instruct the first cell to initiate a handover procedure to handover one or more mobile devices for communications in the second cell by determining based on at least one of power level, scheduled time, frequency, bandwidth, modulation, coding, precoding matrices, and power control parameters.

49. The system of claim 39 wherein the analysis component is configured to determine whether to instruct the first cell to initiate a handover procedure to handover one or more mobile devices for communications in the second cell by considering at least one of improving sum capacity of at least one of the first or second cell, reducing interference to at least one of the first or second cell, balancing cell load of the first or second cell, and providing a minimum quality of minimum quality of service to users of mobile devices in at least one of the first or second cell.

50. The system of claim 39 wherein a signal from the second cell has more power than a signal from the first cell as received at the requesting mobile device.

51. A non-transitory computer readable medium storing a computer program, executable by a machine, for providing a rapidly self-organizing cellular communications network, the computer program comprising executable instructions for:
monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;
determining, based on the received scheduling information, whether to initiate a handover procedure to handover the mobile device to the first cell; and at least one of scheduling the mobile device for communications in the second cell and initiating the handover procedure based on the determination.

52. A non-transitory computer readable medium storing a computer program, executable by a machine, for a rapidly self-organizing cellular communications network, the computer program comprising executable instructions for:

monitoring transmissions of a first cell of a cellular communications network to receive scheduling information for at least one mobile device previously scheduled for communication in the first cell, the scheduling information corresponding to a scheduling decision made for the first cell without the knowledge of scheduling decisions made for a second cell adjacent to the first cell;

determining, based on the received scheduling information, whether to instruct the first cell to initiate a handover procedure to handover one or more mobile devices for communications in the second cell; and instructing, based on the determination, the first cell to initiate the handover procedure to handover the one or more mobile devices for communications in the second cell.

* * * * *